US009166997B1

(12) United States Patent
Guo et al.

(10) Patent No.: US 9,166,997 B1
(45) Date of Patent: Oct. 20, 2015

(54) SYSTEMS AND METHODS FOR REDUCING FALSE POSITIVES WHEN USING EVENT-CORRELATION GRAPHS TO DETECT ATTACKS ON COMPUTING SYSTEMS

(71) Applicant: Symantec Corporation, Mountain View, CA (US)

(72) Inventors: Fanglu Guo, Los Angeles, CA (US); Sandeep Bhatkar, Sunnyvale, CA (US); Kevin Roundy, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 68 days.

(21) Appl. No.: 14/031,044

(22) Filed: Sep. 19, 2013

(51) Int. Cl.
*H04L 29/00* (2006.01)
*H04L 29/06* (2006.01)
*G06F 21/57* (2013.01)

(52) U.S. Cl.
CPC .......... *H04L 63/1433* (2013.01); *G06F 21/577* (2013.01)

(58) Field of Classification Search
CPC ........................... G06F 21/577; H04L 63/1433
See application file for complete search history.

(56) References Cited

U.S. PATENT DOCUMENTS

| | | | | |
|---|---|---|---|---|
| 7,483,972 B2 * | 1/2009 | Bhattacharya et al. | ........ | 709/224 |
| 7,624,448 B2 * | 11/2009 | Coffman | .......................... | 726/23 |
| 7,735,141 B1 * | 6/2010 | Noel et al. | ........................ | 726/25 |
| 7,861,300 B2 | 12/2010 | Arnold et al. | | |
| 8,104,090 B1 * | 1/2012 | Pavlyushchik | .................. | 726/24 |
| 8,341,745 B1 | 12/2012 | Chau et al. | | |
| 8,401,982 B1 * | 3/2013 | Satish et al. | ..................... | 706/20 |
| 8,555,385 B1 * | 10/2013 | Bhatkar et al. | .................. | 726/22 |
| 8,566,938 B1 | 10/2013 | Prakash et al. | | |
| 8,793,790 B2 * | 7/2014 | Khurana et al. | ................. | 726/22 |

(Continued)

FOREIGN PATENT DOCUMENTS

| | | |
|---|---|---|
| CN | 102571469 | 7/2012 |
| CN | 102893289 | 1/2013 |
| EP | 2515250 | 10/2012 |

OTHER PUBLICATIONS

Roschke, Sebastian et al., "A New Alert Correlation Algorithm Based on Attack Graph" CISIS 2011, pp. 58-67.*

(Continued)

*Primary Examiner* — Michael Pyzocha
(74) *Attorney, Agent, or Firm* — ALG Intellectual Property, LLC

(57) ABSTRACT

A computer-implemented method for reducing false positives when using event-correlation graphs to detect attacks on computing systems may include (1) detecting a suspicious event involving a first actor within a computing system, (2) constructing an event-correlation graph that includes a first node that represents the first actor, a second node that represents a second actor, and an edge that represents an additional suspicious event involving the first actor and the second actor, (3) comparing the event-correlation graph with at least one additional event-correlation graph that represents events on at least one additional computing system, (4) determining that a similarity of the event-correlation graph and the additional event-correlation graph exceeds a predetermined threshold, and (5) classifying the suspicious event as benign based on determining that the similarity of the event-correlation graph and the additional event-correlation graph exceeds the predetermined threshold. Various other methods, systems, and computer-readable media are also disclosed.

20 Claims, 10 Drawing Sheets

(56) References Cited

U.S. PATENT DOCUMENTS

| | | | |
|---|---|---|---|
| 8,881,288 B1* | 11/2014 | Levy et al. | 726/25 |
| 2005/0138413 A1* | 6/2005 | Lippmann et al. | 713/201 |
| 2006/0212941 A1* | 9/2006 | Bronnikov et al. | 726/24 |
| 2007/0209074 A1* | 9/2007 | Coffman | 726/23 |
| 2007/0209075 A1* | 9/2007 | Coffman | 726/23 |
| 2007/0226796 A1* | 9/2007 | Gilbert et al. | 726/22 |
| 2008/0313734 A1* | 12/2008 | Rozenberg et al. | 726/22 |
| 2009/0138590 A1* | 5/2009 | Lee et al. | 709/224 |
| 2009/0144308 A1 | 6/2009 | Huie et al. | |
| 2010/0031093 A1* | 2/2010 | Sun et al. | 714/45 |
| 2010/0082513 A1* | 4/2010 | Liu | 706/46 |
| 2010/0115620 A1* | 5/2010 | Alme | 726/24 |
| 2010/0180344 A1* | 7/2010 | Malyshev et al. | 726/23 |
| 2010/0186088 A1* | 7/2010 | Banerjee et al. | 726/23 |
| 2010/0192226 A1 | 7/2010 | Noel et al. | |
| 2010/0235879 A1* | 9/2010 | Burnside et al. | 726/1 |
| 2011/0047620 A1 | 2/2011 | Mahaffey et al. | |
| 2011/0083180 A1* | 4/2011 | Mashevsky et al. | 726/23 |
| 2012/0102542 A1* | 4/2012 | Kobayashi et al. | 726/1 |
| 2012/0216280 A1* | 8/2012 | Zorn et al. | 726/23 |
| 2012/0246720 A1* | 9/2012 | Xie et al. | 726/22 |
| 2013/0042294 A1 | 2/2013 | Colvin et al. | |
| 2013/0318616 A1* | 11/2013 | Christodorescu et al. | 726/25 |
| 2013/0333032 A1 | 12/2013 | Delatorre et al. | |
| 2014/0165195 A1* | 6/2014 | Brdiczka et al. | 726/23 |
| 2014/0365646 A1 | 12/2014 | Xiong | |

OTHER PUBLICATIONS

Kevin Roundy, et al; Systems and Methods for Using Event-Correlation Graphs to Detect Attacks on Computing Systems; U.S. Appl. No. 14/041,762, filed Sep. 30, 2013.

Bruce McCorkendale, et al; Systems and Methods for Detecting Malware; U.S. Appl. No. 13/422,702, filed Mar. 16, 2012.

Acar Tamersoy, et al; Systems and Methods for Adjusting Suspiciousness Scores in Event-Correlation Graphs; U.S. Appl. No. 14/138,891, filed Dec. 23, 2013.

Paleari, Roberto et al., "Automatic Generation of Remediation Procedures for Malware Infections", https://www.usenix.org/legacy/event/sec10/tech/full_papers/Paleari.pdf, as accessed Feb. 6, 2014, USENIX Security'10 Proceedings of the 19th USENIX conference on Security, USENIX Association, Berkeley, CA, (2010).

"Combating Advanced Persistent Threats—How to prevent, detect, and remediate APTs", http://www.mcafee.com/us/resources/white-papers/wp-combat-advanced-persist-threats.pdf, as accessed Feb. 6, 2014, McAfee, Inc., Santa Clara, CA, (2011).

"Advanced Persistent Threat (APT) Attack & Zero-Day Protection", http://www.fireeye.com/, as accessed Feb. 6, 2014, FireEye, Inc., (2006).

"Advanced Threat Defense", http://www.fidelissecurity.com/advanced-persistent-threat-protection, as accessed Feb. 6, 2014, General Dynamics Fidelis Cybersecurity Solutions, Inc., (2013).

"Mandiant for Security Operations", https://www.mandiant.com/products/mandiant-platform/security-operations, as accessed Feb. 6, 2014, Mandiant, A FireEye Company, (Mar. 1, 2013).

"Mandiant for Intelligent Response", http://www.mandiant.com/products/mandiant-platform/intelligent-response, as accessed Feb. 6, 2014, Mandiant, A FireEye Company, (Mar. 1, 2013).

"Solera Networks Inc.", http://www.soleranetworks.com/, as accessed Feb. 6, 2014, (Feb. 16, 2005).

"LogRhythm, Inc.", http://www.logrhythm.com/, as accessed Feb. 6, 2014, (Oct. 18, 2000).

Kevin Alejandro Roundy, et al; Systems and Methods for Using Event-Correlation Graphs to Generate Remediation Procedures; U.S. Appl. No. 14/221,703, filed Mar. 21, 2014.

Adam Glick, et al; Systems and Methods for User-Directed Malware Remediation; U.S. Appl. No. 13/419,360, filed Mar. 13, 2012.

Carey Nachenberg, et al; Systems and Methods for Neutralizing File-Format-Specific Exploits Included Within Files Contained Within Electronic Communications; U.S. Appl. No. 13/418,332, filed Mar. 12, 2012.

Leylya Yumer, et al; Systems and Methods for Analyzing Zero-Day Attacks; U.S. Appl. No. 13/901,977, filed May 24, 2013.

Lee, Kyumin et al., "Content-Driven Detection of Campaigns in Social Media", http://faculty.cs.tamu.edu/caverlee/pubs/lee11cikm.pdf, as accessed Aug. 8, 2013, CIKM'11; ACM; Glasgow, Scotland, UK, (Oct. 2011).

Bhuyan, Monowar H., et al., "AOCD: An Adaptive Outlier Based Coordinated Scan Detection Approach", http://www.cs.uccs.edu/~jkalita/papers/2012/BhuyanMonowarIJNS2012.pdf, as accessed Aug. 8, 2013, International Journal of Network Security; vol. 14, No. 6, (Nov. 2012), 339-351.

Eberle, William et al., "Graph-based approaches to insider threat detection", http://dl.acm.org/citation.cfm?id=1558658, as accessed Aug. 8, 2013, CSIIRW '09 Proceedings of the 5th Annual Workshop on Cyber Security and Information Intelligence Research: Cyber Security and Information Intelligence Challenges and Strategies; Article No. 44; ACM; (2009).

Splunk, Inc., "Detecting Advanced Persistent Threats—Using Splunk for APT", http://www.splunk.com/web_assets/pdfs/secure/Splunk_for_APT_Tech_Brief.pdf, as accessed Aug. 8, 2013, Tech Brief, (Jan. 4, 2012).

Triumfant, Inc., "Detecting the Advanced Persistent Threat", www.triumfant.com/advanced_persistent_threat.asp, as accessed Aug. 8, 2013, (Nov. 30, 2010).

EMC Corporation, "Advanced Persistent Threat (APT) and Rootkit Detection", http://www.siliciumsecurity.com/advanced-persistent-threats-and-rootkits-detection/, as accessed Aug. 8, 2013, (2012).

Colombe, Jeffrey B., et al., "Statistical profiling and visualization for detection of malicious insider attacks on computer networks", http://dl.acm.org/citation.cfm?id=1029231, as accessed Nov. 13, 2013, VizSEC/DMSEC '04 Proceedings of the 2004 ACM workshop on Visualization and data mining for computer security, ACM, New York, NY, (2004), 138-142.

Wang, Wei et al., "Diffusion and graph spectral methods for network forensic analysis", http://dl.acm.org/citation.cfm?id=1278956, as accessed Nov. 13, 2013, NSPW '06 Proceedings of the 2006 workshop on New security paradigms, ACM, New York, NY, (2006), 99-106.

Julisch, Klaus "Clustering intrusion detection alarms to support root cause analysis", http://dl.acm.org/citation.cfm?id=950192, as accessed Nov. 13, 2013, ACM Transactions on Information and System Security (TISSEC), vol. 6, Issue 4, ACM, New York, NY, (Nov. 2003), 443-471.

Treinen, James J., et al., "A framework for the application of association rule mining in large intrusion detection infrastructures", http://dl.acm.org/citation.cfm?id=2166375, as accessed Nov. 13, 2013, RAID'06 Proceedings of the 9th international conference on Recent Advances in Intrusion Detection, Springer-Verlag Berlin, Heidelberg, (2006), 1-18.

Gu, Guofei et al., "BotHunter: detecting malware infection through IDS-driven dialog correlation", http://dl.acm.org/citation.cfm?id=1362915, as accessed Nov. 13, 2013, SS'07 Proceedings of 16th USENIX Security Symposium on USENIX Security Symposium, Article No. 12, USENIX Association, Berkeley, CA, (2007).

Valdes, Alfonso et al., "Probabilistic Alert Correlation", http://dl.acm.org/citation.cfm?id=670734, as accessed Nov. 13, 2013, RAID '00 Proceedings of the 4th International Symposium on Recent Advances in Intrusion Detection, Springer-Verlag, London, UK, (2001), 54-68.

Alsubhi, Khalid et al., "FuzMet: a fuzzy-logic based alert prioritization engine for intrusion detection systems", http://dl.acm.org/citation.cfm?id=2344711, as accessed Nov. 13, 2013, International Journal of Network Management, vol. 22 Issue 4, John Wiley & Sons, Inc., New York, NY, (Jul. 2012).

Zamlot, Loai et al., "Prioritizing intrusion analysis using Dempster-Shafer theory", http://dl.acm.org/citation.cfm?id=2046694, as accessed Nov. 13, 2013, AISec '11 Proceedings of the 4th ACM workshop on Security and artificial intelligence, ACM, New York, NY, (2011), 59-70.

(56) References Cited

OTHER PUBLICATIONS

Oliner, Adam J., et al., "Community epidemic detection using time-correlated anomalies", http://dl.acm.org/citation.cfm?id=1894191, as accessed Nov. 13, 2013, RAID'10 Proceedings of the 13th international conference on Recent advances in intrusion detection, Springer-Verlag Berlin, Heidelberg, (2010), 360-381.

Ning, Peng et al., "Constructing attack scenarios through correlation of intrusion alerts", http://reeves-students.csc.ncsu.edu/papers-and-other-stuff/2002-10-ccs-constructing-attack-scenarios-paper.pdf, as accessed Nov. 13, 2013, CCS '02 Proceedings of the 9th ACM conference on Computer and communications security, ACM, Washington, DC, (Nov. 18-22, 2002), 245-254.

Wang, Wei et al., "A Graph Based Approach Toward Network Forensics Analysis", http://dl.acm.org/citation.cfm?id=1410238, as accessed Nov. 13, 2013, ACM Transactions on Information and System Security (TISSEC), vol. 12, Issue 1, Article No. 4, ACM, New York, NY, (Oct. 2008).

Valeur, Fredrik et al., "A Comprehensive Approach to Intrusion Detection Alert Correlation", http://dl.acm.org/citation.cfm?id=1038251, as accessed Nov. 13, 2013, IEEE Transactions on Dependable and Secure Computing, vol. 1, Issue 3, IEEE Computer Society Press, Los Alamitos, CA, (Jul. 2004),146-169.

Tedesco, Gianni et al., "Real-Time Alert Correlation with Type Graphs", http://dl.acm.org/citation.cfm?id=1496279, as accessed Nov. 13, 2013, ICISS '08 Proceedings of the 4th International Conference on Information Systems Security, Springer-Verlag Berlin, Heidelberg, (2008),173-187.

Wang, Wei et al., "Network Forensics Analysis with Evidence Graphs", http://www.dfrws.org/2005/proceedings/wang_evidencegraphs.pdf, as accessed Nov. 13, 2013, 2005 Digital Forensic Research Workshop (DFRWS), New Orleans, LA, (2005).

Wang, Ting et al., "Microscopic Social Influence", http://www.cc.gatech.edu/~lingliu/papers/2012/TingWang-SDM2012.pdf, as accessed Nov. 13, 2013, SDM 2012.

Ugander, Johan et al., "Balanced Label Propagation for Partitioning Massive Graphs", https://people.cam.cornell.edu/~jugander/papers/wsdm13-blp.pdf, as accessed Nov. 13, 2013, WSDM'13, ACM, Rome, Italy, (Feb. 4-8, 2013).

Ayday, Erman et al., "Iterative Trust and Reputation Management Using Belief Propagation", http://www.ece.gatech.edu/research/labs/WCCL/BP_publications/BP-ITRM-journal.pdf, as accessed Nov. 13, 2013, IEEE Transactions on Dependable and Secure Computing, vol. 9, No. 3, IEEE Computer Society, (May/Jun. 2012), 375-386.

Eberle, William et al., "Insider Threat Detection Using Graph-Bases Approaches", http://www.eecs.wsu.edu/-holder/pubs/EberleCATCH09.pdf, Cybersecurity Applications & Technology Conference for Homeland Security, (Jan. 2009).

Constantin, Lucian, "Attackers used known exploit to steal customer log-in credentials, vBulletin maker says", http://www.networkworid.com/article/2171967/access-control/attackers-used-known-exploit-to-steal-customer-log-in-credentials--vbulletin-maker-sa.html, IDG News Service, Network World, (Nov. 18, 2013).

"Recovery Manager for Active Directory Forest Edition", http://software.dell.com/documents/recovery-manager-for-active-directory-forest-edition-datasheet-26622.pdf, Dell, Inc., (Nov. 2013).

Scarfone, Karen et al., "Guide to Intrusion Detection and Prevention Systems (IDPS)", http://csrc.nist.gov/publications/nistpubs/800-94/SP800-94, National Institute of Standards and Technology, Special Publication 800-94, (Feb. 2007).

Dezert, Jean et al., "On the Validity of Dempster-Shafer Theory", Fusion 2012—15th International Conference on Information Fusion, Singapour, Singapore, (Jul. 2012).

\* cited by examiner

SYSTEMS AND METHODS FOR REDUCING FALSE POSITIVES WHEN USING EVENT-CORRELATION GRAPHS TO DETECT ATTACKS ON COMPUTING SYSTEMS

BACKGROUND

In recent years, malicious programmers have created a variety of sophisticated targeted attacks and advanced persistent threats aimed at high-profile or high-level entities, such as governments, corporations, political organizations, defense contractors, or the like. In many cases, the goal of such targeted attacks is to gain access to highly sensitive or confidential information, such as financial information, defense-related information, and/or intellectual property (e.g., source code), and/or to simply disrupt an entity's operations.

Many such attacks involve sending emails to a targeted entity that contain an attachment that has been carefully crafted to take advantage of an as-yet-undiscovered vulnerability of a particular application (commonly known as a "zero-day" exploit). Because many security software companies attempt to combat malware by creating and deploying malware signatures (e.g., hash functions) that uniquely identify known malware, this type of targeted attack (commonly known as a "spear phishing" attack) is often difficult for traditional security software to detect and/or neutralize since the exploits in question have yet to be publicly discovered.

Consumers and businesses face a growing tide of malicious software that threatens the stability and performance of their computers and the security of their data. Computer programmers with malicious motivations have created and continue to create viruses, Trojan horses, worms, and other programs (collectively known as "malware") in an attempt to compromise computer systems. In an attempt to evade detection, malicious programmers may inject malware into or among legitimate programs.

Many security software companies attempt to combat malware by creating and deploying malware signatures (e.g., hash functions that uniquely identify malware) to their customers on a regular basis. However, a significant amount of malware has not yet been identified and therefore cannot be detected using traditional signature-based malware-detection mechanisms, particularly since malware authors may regularly modify their malware in an attempt to circumvent commonly employed signature-based malware-detection mechanisms. Furthermore, signature-based malware detection may fail to provide zero-day protection against new malware.

In addition to or as an alternative to a signature-based approach, security software companies may apply a variety of heuristics to classify programs (e.g., as malware or as safe). Unfortunately, heuristic classification methods may result in false negatives, allowing malware to continue to execute. Some heuristic classification methods may use more expansive techniques to reduce false negatives, only to result in false positives, potentially interfering with legitimate software applications.

Accordingly, the instant disclosure identifies and addresses a need for additional and improved systems and methods for reducing false positives when using event-correlation graphs to detect attacks on computing systems.

SUMMARY

As will be described in greater detail below, the instant disclosure generally relates to systems and methods for reducing false positives when using event-correlation graphs to detect attacks on computing systems by constructing an event-correlation graph around a suspicious event observed on a computing system, identifying similar event-correlation graphs constructed for other computing systems, and determining that the suspicious event is benign based on the similar event-correlation graphs.

In one example, a computer-implemented method for reducing false positives when using event-correlation graphs to detect attacks on computing systems may include (1) detecting a suspicious event involving a first actor within a computing system, (2) constructing, in response to detecting the suspicious event involving the first actor, an event-correlation graph that includes (i) a first node that represents the first actor, (ii) a second node that represents a second actor, and (iii) an edge that interconnects the first node and the second node and represents an additional suspicious event involving the first actor and the second actor, (3) comparing the event-correlation graph with at least one additional event-correlation graph that represents events on at least one additional computing system, (4) determining that a similarity of the event-correlation graph and the additional event-correlation graph exceeds a predetermined threshold, and (5) classifying the suspicious event as benign based at least in part on determining that the similarity of the event-correlation graph and the additional event-correlation graph exceeds the predetermined threshold.

In some examples, classifying the suspicious event as benign may include determining a number of computing systems with event-correlation graphs that are similar to the event-correlation graph exceeds a predetermined size. In some examples, the computer-implemented method may further include waiting for a predetermined period of time and collecting event-correlation graphs from a plurality of computing systems before classifying the suspicious event.

In some examples, constructing the event-correlation graph may include (1) calculating, based at least in part on the additional suspicious event involving the first actor and the second actor, an attack score for the event-correlation graph, and (2) determining that the attack score is greater than an attack-score threshold.

In one embodiment, the suspicious event may include a process injection. In one example, the additional suspicious event may include (1) a process injection, (2) a creation of a file, (3) a download of an executable file, and/or (4) a creation of a process.

In some examples, constructing the event-correlation graph may include, for each actor represented by a node within the event-correlation graph, (1) identifying a set of events that involve the actor and at least one additional actor and (2) for each event within the set of events, (i) adding an additional node to the event-correlation graph that represents the additional actor and (ii) adding an additional edge to the event-correlation graph that interconnects the node and additional node and represents the event involving the actor and the additional actor.

In some examples, constructing the event-correlation graph may include, for each actor represented by a node within the event-correlation graph (1) identifying a set of suspicious events that involve the actor and no other actor, and (2) associating each suspicious event within the set of suspicious events with the node that represents the actor. In one embodiment, each suspicious event represented within the event-correlation graph may be associated with a suspiciousness score, and calculating the attack score for the event-correlation graph may be based at least in part on the suspiciousness score of each suspicious event represented within the event-correlation graph.

In some examples, calculating the attack score for the event-correlation graph may include (1) calculating a score for each edge within the event-correlation graph based at least in part on a suspiciousness score associated with the suspicious event represented by the edge, and (2) calculating the attack score for the event-correlation graph based at least in part on the score for each edge within the event-correlation graph. In some examples, calculating the attack score for the event-correlation graph may include (1) calculating a score for each node within the event-correlation graph based at least in part on a suspiciousness score associated with each suspicious event associated with the node, and (2) calculating the attack score for the event-correlation graph based at least in part on the score for each node within the event-correlation graph.

In one embodiment, the computer-implemented method may further include removing, before calculating the attack score for the event-correlation graph, at least one low-scoring node from the event-correlation graph based at least in part on a score of the low-scoring node being less than an additional predetermined threshold. In one example, the computer-implemented method may further include removing, before calculating the attack score for the event-correlation graph, at least one remote node from the event-correlation graph based at least in part on a distance of the remote node from the first node being greater than an additional predetermined threshold.

In one embodiment, a system for implementing the above-described method may include (1) a detecting module that detects a suspicious event involving a first actor within a computing system, (2) a constructing module that constructs, in response to detecting the suspicious event involving the first actor, an event-correlation graph that includes (i) a first node that represents the first actor, (ii) a second node that represents a second actor, and (iii) an edge that interconnects the first node and the second node and represents an additional suspicious event involving the first actor and the second actor, (3) a comparing module that compares the event-correlation graph with at least one additional event-correlation graph that represents events on at least one additional computing system, (4) a determining module that determines that a similarity of the event-correlation graph and the additional event-correlation graph exceeds a predetermined threshold, (5) a classifying module that classifies the suspicious event as benign based at least in part on determining that the similarity of the event-correlation graph and the additional event-correlation graph exceeds the predetermined threshold, and (6) at least one processor configured to execute the detecting module, the constructing module, the comparing module, the determining module, and the classifying module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) detect a suspicious event involving a first actor within a computing system, (2) construct, in response to detecting the suspicious event involving the first actor, an event-correlation graph that include (i) a first node that represents the first actor, (ii) a second node that represents a second actor, and (iii) an edge that interconnects the first node and the second node and represents an additional suspicious event involving the first actor and the second actor, (3) compare the event-correlation graph with at least one additional event-correlation graph that represents events on at least one additional computing system, (4) determine that a similarity of the event-correlation graph and the additional event-correlation graph exceeds a predetermined threshold, and (5) classify the suspicious event as benign based at least in part on determining that the similarity of the event-correlation graph and the additional event-correlation graph exceeds the predetermined threshold.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
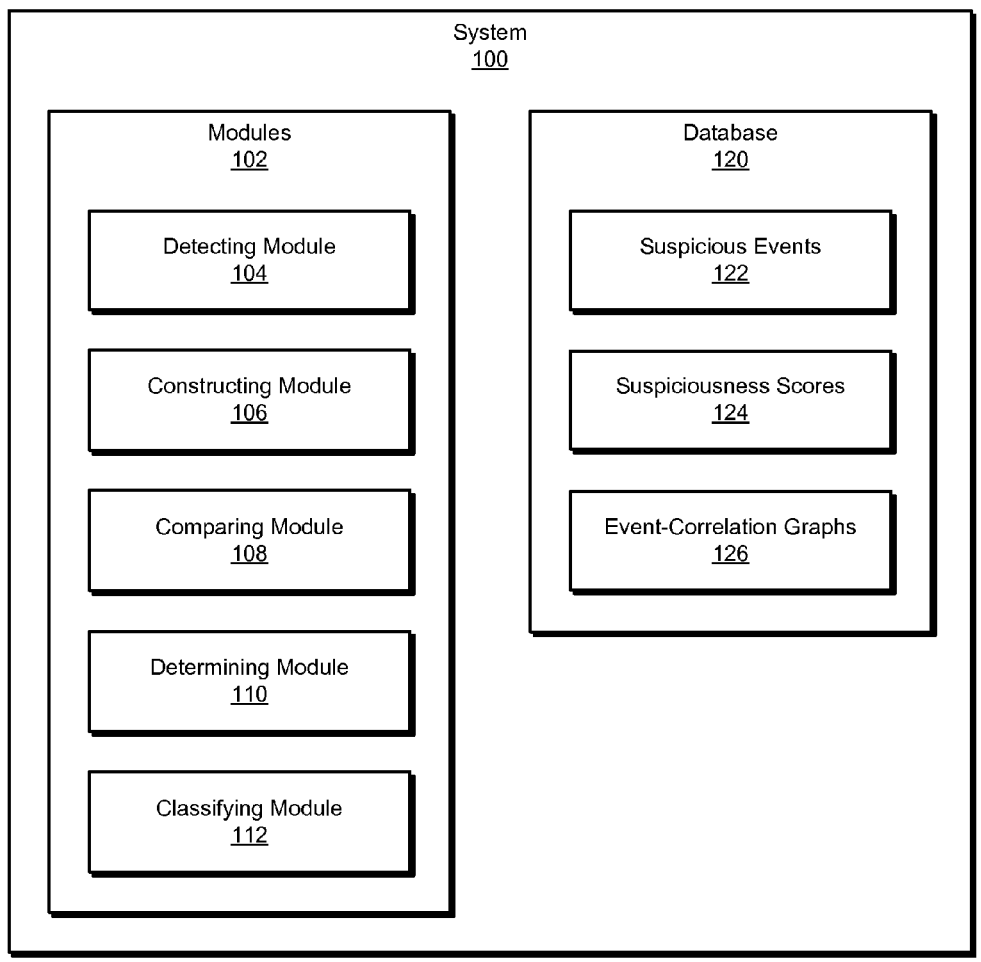
FIG. 1 is a block diagram of an exemplary system for reducing false positives when using event-correlation graphs to detect attacks on computing systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for reducing false positives when using event-correlation graphs to detect attacks on computing systems. As will be explained in greater detail below, by constructing an event-correlation graph around a suspicious event observed on a computing system, identifying similar event-correlation graphs constructed for other computing systems, and determining that the suspicious event is benign based on the similar event-correlation graphs, the systems and methods described herein may separate activity generated from benign applications (e.g., that are installed on many different computing systems) from targeted attacks (e.g., which may be designed to be stealthy and affect only a small number of computing systems). These systems and methods may thereby reduce false positives from the use of event-correlation graphs to detect attacks.

Figure 2:
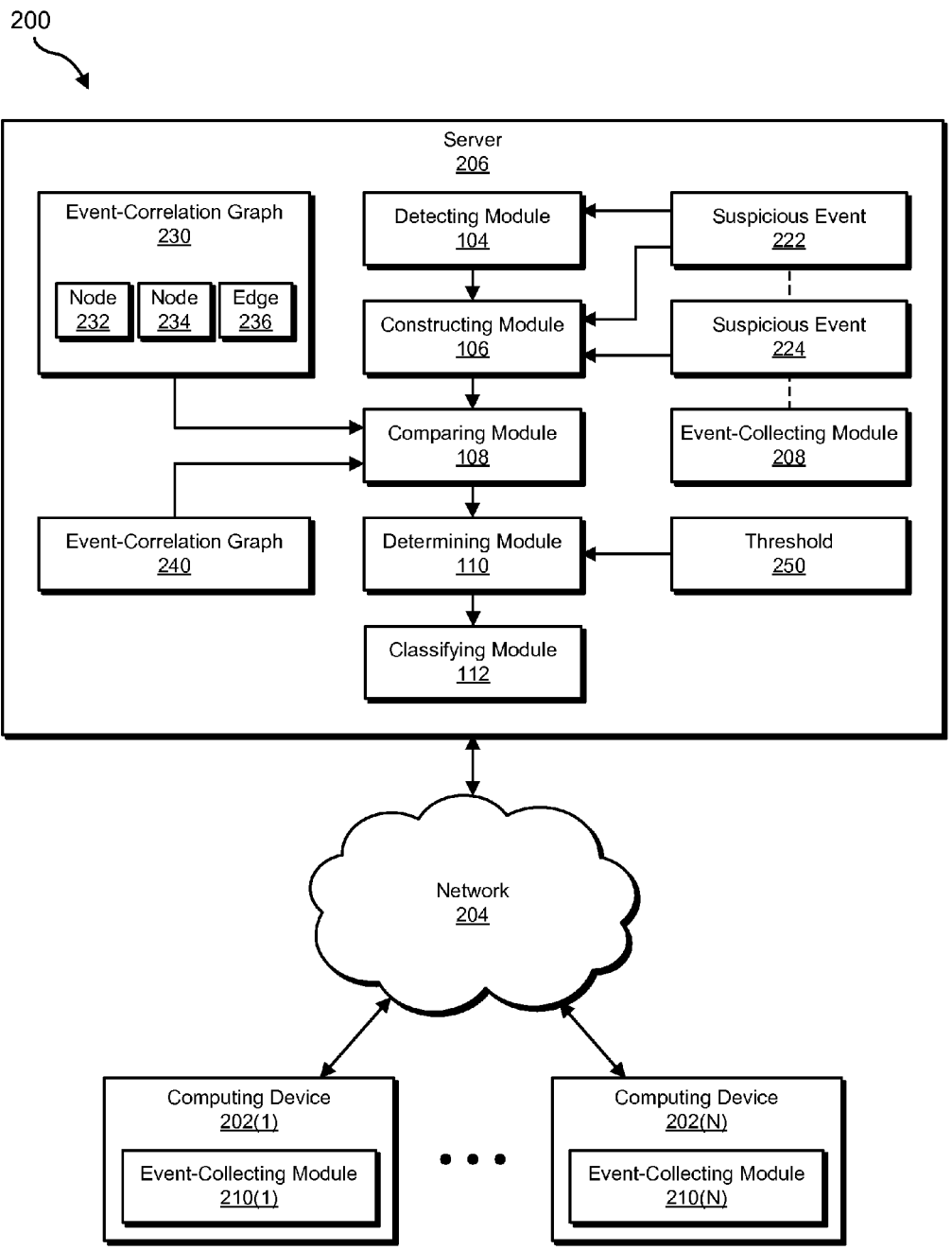
FIG. 2 is a block diagram of an exemplary system for reducing false positives when using event-correlation graphs to detect attacks on computing systems.

The following will provide, with reference to FIGS. 1-2, detailed descriptions of exemplary systems for reducing false positives when using event-correlation graphs to detect attacks on computing systems. Detailed descriptions of corresponding computer-implemented methods will also be provided in connection with FIG. 3. Detailed descriptions of exemplary event-correlation graphs will be provided in connection with FIGS. 4-8. In addition, detailed descriptions of an exemplary computing system and network architecture capable of implementing one or more of the embodiments described herein will be provided in connection with FIGS. 9 and 10, respectively.

FIG. 1 is a block diagram of exemplary system 100 for reducing false positives when using event-correlation graphs to detect attacks on computing systems. As illustrated in this figure, exemplary system 100 may include one or more modules 102 for performing one or more tasks. For example, and as will be explained in greater detail below, exemplary system 100 may also include a detecting module 104 that may detect a suspicious event involving a first actor within a computing system. Exemplary system 100 may additionally include a constructing module 106 that may construct, in response to detecting the suspicious event involving the first actor, an event-correlation graph that includes (i) a first node that represents the first actor, (ii) a second node that represents a second actor, and (iii) an edge that interconnects the first node and the second node and represents an additional suspicious event involving the first actor and the second actor. Exemplary system 100 may also include a comparing module 108 that may compare the event-correlation graph with at least one additional event-correlation graph that represents events on at least one additional computing system. Exemplary system 100 may additionally include a determining module 110 that may determine that a similarity of the event-correlation graph and the additional event-correlation graph exceeds a predetermined threshold. Exemplary system 100 may also include a classifying module 112 that may classify the suspicious event as benign based at least in part on determining that the similarity of the event-correlation graph and the additional event-correlation graph exceeds the predetermined threshold. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 910 in FIG. 9, and/or portions of exemplary network architecture 1000 in FIG. 10. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may store information about one or more suspicious events (e.g., suspicious events 122), information about suspiciousness scores associated with suspicious events (e.g., suspiciousness scores 124), and/or information about one or more correlation graphs (e.g., event-correlation graphs 126).

Database 120 may represent portions of a single database or computing device or a plurality of databases or computing devices. For example, database 120 may represent a portion of server 206 and/or a portion of computing devices 202(1)-(N) in FIG. 2, computing system 910 in FIG. 9, and/or portions of exemplary network architecture 1000 in FIG. 10. Alternatively, database 120 in FIG. 1 may represent one or more physically separate devices capable of being accessed by a computing device, such as server 206 in FIG. 2, computing system 910 in FIG. 9, and/or portions of exemplary network architecture 1000 in FIG. 10.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) in communication with a server 206 via a network 204. Computing devices 202(1)-(N) may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing devices 202(1)-(N) and/or server 206, enable computing devices 202(1)-(N) and/or server 206 to reduce false positives when using event-correlation graphs to detect attacks on computing systems. For example, and as will be described in greater detail below, one or more of modules 102 may cause computing devices 202(1)-(N) and/or server 206 to reduce false positives when using event-correlation graphs to detect attacks on computing systems. For example, and as will be described in greater detail below, detecting module 104 may be programmed to detect a suspicious event 222 involving a first actor within a computing system (e.g., computing device 202(1)). Constructing module 106 may be programmed to construct, in response to detecting suspicious event 222 involving the first actor, an event-correlation graph 230 that may include at least a node 232 that represents the first actor, a node 234 that represents a second actor, and an edge 236 that interconnects node 232 and node 234 and represents an additional suspicious event 224 involving the first actor and the second actor. Comparing module 108 may be programmed to compare event-correlation graph 230 with at least one additional event-correlation graph 240 that represents events on an additional computing system (e.g., computing device 202(N)). Determining module 110 may be programmed to determine that a similarity of event-correlation graph 230 and additional event-correlation graph 240 exceeds a predetermined threshold 250. Classifying module 112 may be programmed to classify suspicious event 222 as benign based at least in part on determining that the similarity of event-correlation graph 230 and additional event-correlation graph 240 exceeds a predetermined threshold 250.

Computing devices 202(1)-(N) generally represent any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, combinations of one or more of the same, exemplary computing system 910 in FIG. 9, or any other suitable computing device. As illustrated in FIG. 2, one or more of event-collecting modules 210(1)-(N) may detect, log, and/or transmit information about suspicious events (e.g., to server 206).

Server 206 generally represents any type or form of computing device that is capable of reading computer-executable instructions. Examples of server 206 include, without limitation, application servers and database servers configured to provide various database services and/or run certain software applications. As illustrated in FIG. 2, server 206 may include an event-collecting module 208 that collects event information from computing devices 202(1)-(N) and stores this information to database 120. In at least one example, event-collecting module 208 may represent a portion of a security information and event management system (SIEM), a security information management system (SIM), and/or security event manager (SEM).

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1000 in FIG. 10, or the like. Network 204 may facilitate communication or data transfer using wireless or wired connections. In one embodiment, network 204 may facilitate communication between computing devices 202(1)-(N) and server 206.

Figure 3:
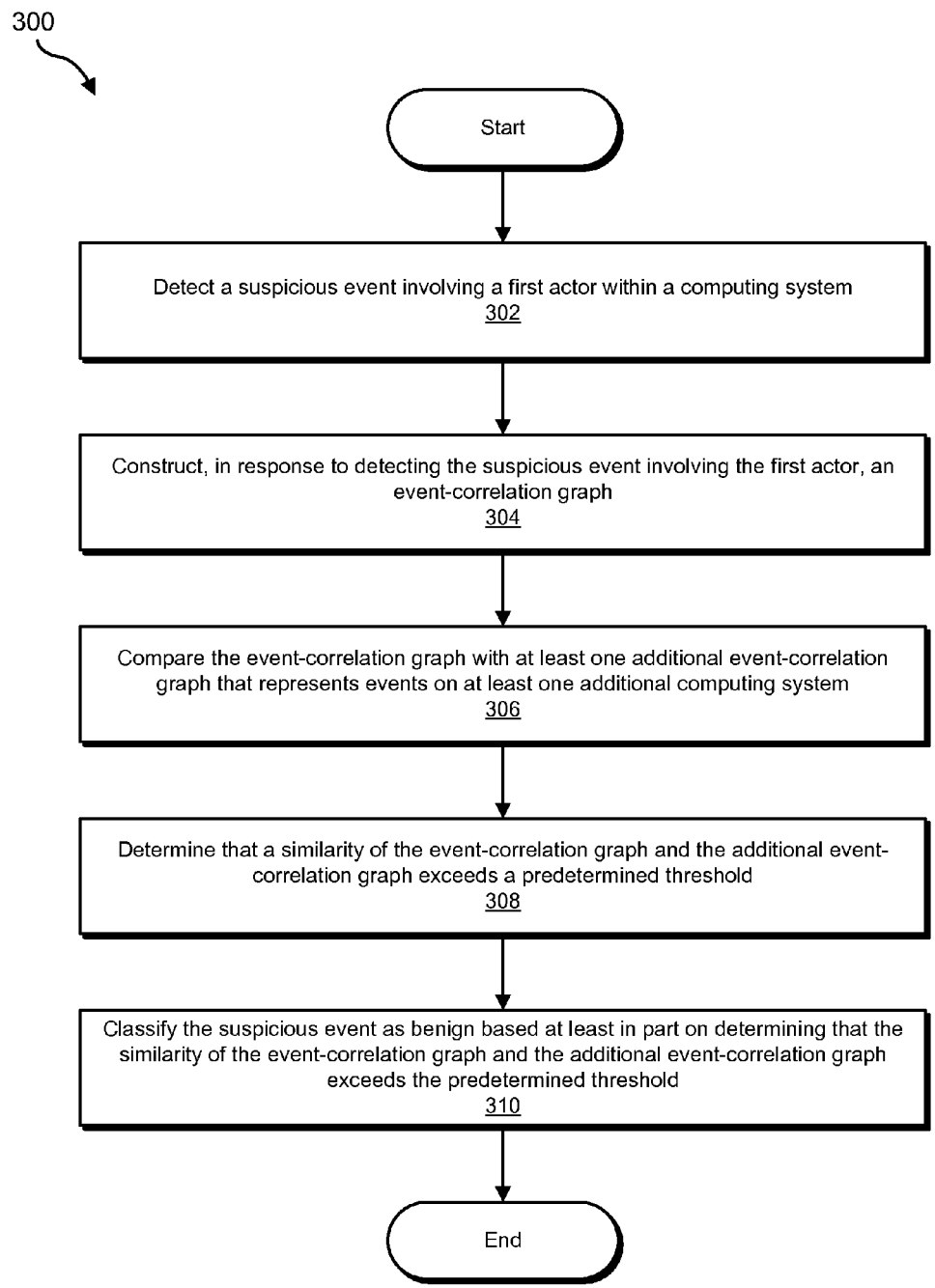
FIG. 3 is a flow diagram of an exemplary method for reducing false positives when using event-correlation graphs to detect attacks on computing systems.

FIG. 3 is a flow diagram of an exemplary computer-implemented method 300 for reducing false positives when using event-correlation graphs to detect attacks on computing systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 910 in FIG. 9, and/or portions of exemplary network architecture 1000 in FIG. 10.

As illustrated in FIG. 3, at step 302 one or more of the systems described herein may detect a suspicious event involving a first actor within a computing system. For example, detecting module 104 may, as part of server 206 in FIG. 2, detect suspicious event 222 involving a first actor within a computing system (e.g., computing system 201(1)).

The phrase "suspicious event," as used herein, generally refers to any occurrence of one or more actions within a computing system that may be indicative of an attack on a computing system. In at least one example, the phrase "suspicious event" may refer to a suspicious high-level event that represents the detection of one or more low-level events. In some examples, the phrase "suspicious event" may represent the occurrence of an action within a computing system that may not reliably indicate an attack on a computing system unless it is correlated with a certain number of additional suspicious events. Examples of suspicious events may include, without limitation, any actions managed and/or monitored by firewalls, routers, switches, virtual private networks, antivirus systems, intrusion detection and intrusion prevention systems, vulnerability scanners, web servers, web filters, proxies, databases, email and/or groupware systems, authentication servers, and/or system loggers. Additionally or alternatively, a suspicious event may represent events detected and/or managed by a Security Information and Event Management system (SIEM), a Security Information Management system (SIM), and/or a Security Event Manager (SEM).

In some examples, the suspicious event may include a process injection. As used herein, the phrase "process injection" may refer to any method for one process to introduce executable instructions into another process to execute. Examples of process injection may include injecting a dynamic-link library into a running process and hooking a function call within another process.

As used herein, the term "actor" may refer to any computing entity that may perform an action and/or any computing entity that may have an action performed on it. Examples of actors may include, without limitation, user accounts, processes, applications, computing devices, files, ports, information resources (e.g., a website), and/or any network-addressable entities.

Detecting module 104 may detect a suspicious event that involves an actor in any of a variety of ways. For example, detecting module 104 may detect a suspicious event that involves an actor by monitoring the actor and by detecting when the actor performs a suspicious action. For example, detecting module 104 may represent an agent of a SIEM or SIM system running on a computing device that detects and/or collects information about suspicious events that occur on the computing device and may detect the suspicious event as part of the agent of the SIEM or SIM system.

In another example, detecting module 104 may detect a suspicious event that involves an actor by receiving information about the suspicious event. Using FIG. 2 as an example, detecting module 104 may receive information about a suspicious event that involved an actor from one or more of event-collecting modules that detected and logged the suspicious event. Additionally or alternatively, detecting module 104 may detect a suspicious event by identifying a previously detected suspicious event. For example, detecting module 104 may represent a server-side or cloud-based system that analyzes information about previously detected suspicious events.

In some examples, detecting module 104 may detect a suspicious event that involves an actor by detecting when the actor performs the suspicious event. For example, detecting module 104 may, as a part of the computing system, detect a suspicious event that involves an actor on the computing system by detecting when the actor performs the suspicious event. In addition to detecting suspicious events, detecting module 104 may also identify information about the event, such as, for example, information that identifies the actor or actors involved with the suspicious event and/or information that identifies attributes of the suspicious event and/or actors.

Figure 4:
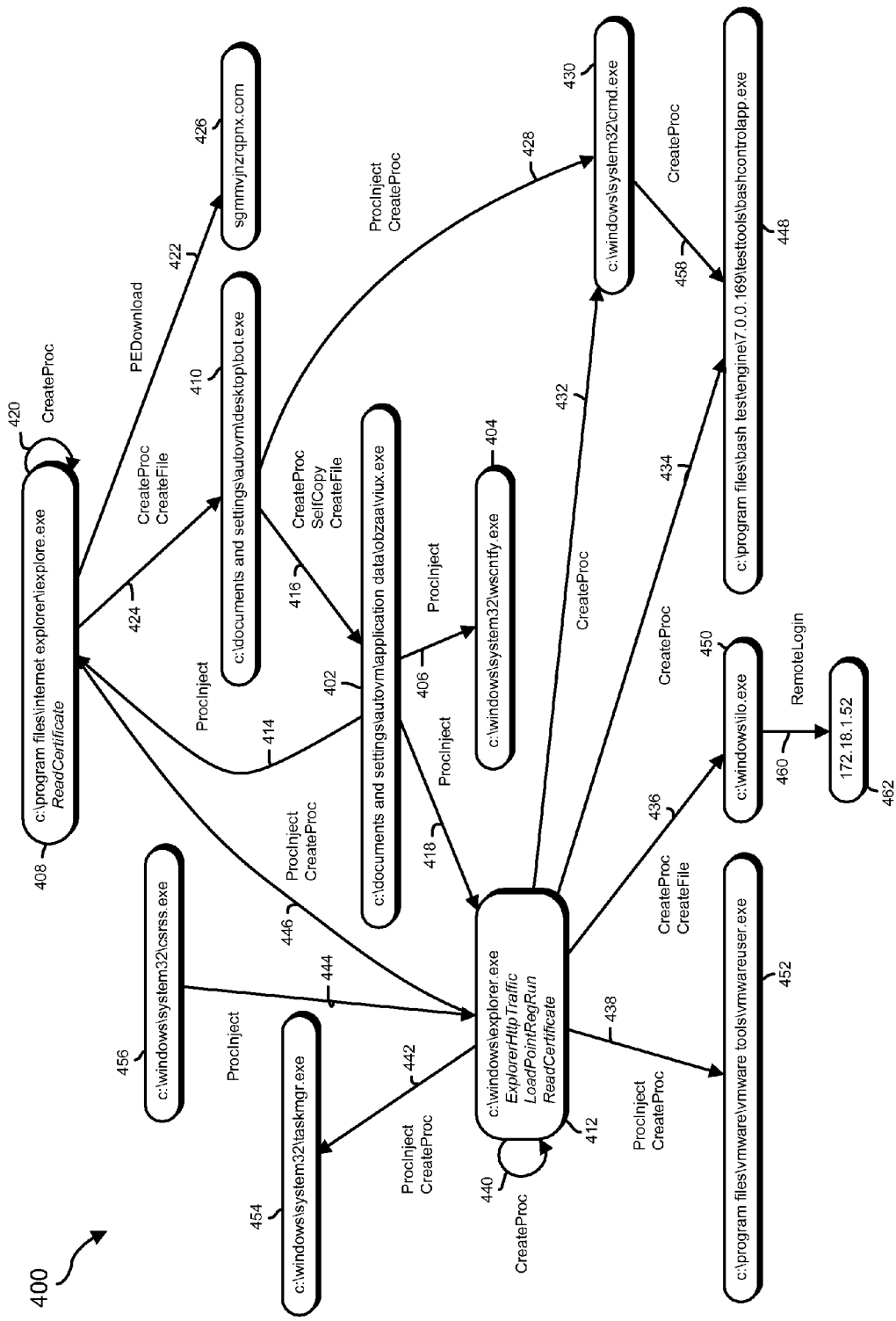
FIG. 4 is a block diagram of an exemplary event-correlation graph.

To provide an example of detecting module 104 detecting the suspicious event, FIG. 4 illustrates an exemplary event-correlation graph 400. As shown in FIG. 4, event-correlation graph 400 may represent an actor 402 (e.g., the process "c:\documents and settings\autovm\application data\obzaa\viux.exe"), an actor 404 (e.g., "the process c:\windows\system32\wscntfy.exe") and an event 406 (e.g., a process injection between actor 402 and actor 404). Using FIG. 4 as an example, at step 302 detecting module 104 may detect event 406.

Returning to FIG. 3, at step 304 one or more of the systems described herein may construct, in response to detecting the suspicious event involving the first actor, an event-correlation graph that may include (i) a first node that represents the first actor, (ii) a second node that represents a second actor, and (iii) an edge that interconnects the first node and the second node and represents an additional suspicious event involving the first actor and the second actor. For example, constructing module 106 may, as part of server 206 in FIG. 2, construct, in response to detecting suspicious event 222 involving the first actor, event-correlation graph 230 that includes node 232 that represents the first actor, node 234 that represents a second actor, and edge 236 that interconnects node 232 and node 234 and represents suspicious event 224 involving the first actor and the second actor.

As used herein, the term "event-correlation graph" generally refers to any logical, topological, and/or graphical representation of one or more correlated suspicious events that is based on how the actors involved in the suspicious events are related by the suspicious events. As will be described in greater detail below, event-correlation graphs may be built from information about one or more suspicious events and may include representations (e.g., nodes) of the actors involved in the suspicious events that are connected by representations (e.g., edges, such as directed edges) of how the actors are related by the suspicious events. Using FIG. 4 as an example, event-correlation graph 400 may include nodes 402-426 interconnected by directed edges 428-462. In this example, nodes 402-426 may represent the actors involved with the correlated suspicious events represented by directed edges 428-462. As will be explained in greater detail below, one or more of the systems described herein may create event-correlation graph 400 in response to detecting the suspicious event represented by edge 428 involving the processes "viux.exe" and "wscntfy.exe" represented by nodes 402 and 404, respectively.

The additional suspicious event may include any of a variety of events. In some examples, detecting module 104 and/or constructing module 106 may identify the additional suspicious event as independently suspicious. Additionally or alternatively, the additional suspicious event may be suspicious in context of the suspicious event. In some examples, the additional suspicious event may include a process injection, the creation of a file, the download of an executable file, and/or the creation of a process.

Constructing module 106 may construct the event-correlation graph in any suitable manner. For example, constructing module 106 may construct the event-correlation graph in response to detecting a suspicious event by identifying additional suspicious events that may be correlated with the suspicious event based on how the actors involved in the suspicious event and the additional suspicious events are related by the suspicious event and the additional suspicious events.

In one example, constructing module 106 may construct an event-correlation graph in response to detecting a suspicious event by adding one or more nodes and edges based on a single suspicious event, after which constructing module 106 may iteratively add nodes and edges to the event-correlation graph starting with the suspicious event and any actors involved in the suspicious event. For example, in response to detecting a suspicious event involving a first actor, constructing module 106 may construct an event-correlation graph for the suspicious event by first generating an event-correlation graph that includes at least a node that represents the first actor. In the event that the suspicious event involves a second actor, construction module 106 may add an additional node to the event-correlation graph that represents the second actor and an edge that connects the nodes representing the first and second actors.

In some examples, constructing module 106 may construct the event-correlation graph using only suspicious events. For example upon adding at least one node to the event-correlation graph, constructing module 106 may identify, for each actor represented by a node within the event-correlation graph, a set of suspicious events that involve the actor and at least one additional actor. Constructing module 106 may further add, for each suspicious event within the set of suspicious events, an additional node to the event-correlation graph that represents the additional actor adding an additional edge to the event-correlation graph that interconnects the node and additional node and represents the event involving the actor and the additional actor.

In addition or as an alternative to identifying suspicious events that involve two or more actors, constructing module 106 may, for each actor represented by a node within the event-correlation graph, identify a set of suspicious events that involve the actor and no other actor. In this example, constructing module 106 may further associate each suspicious event within the set of suspicious events with the node that represents the actor.

Figure 5:
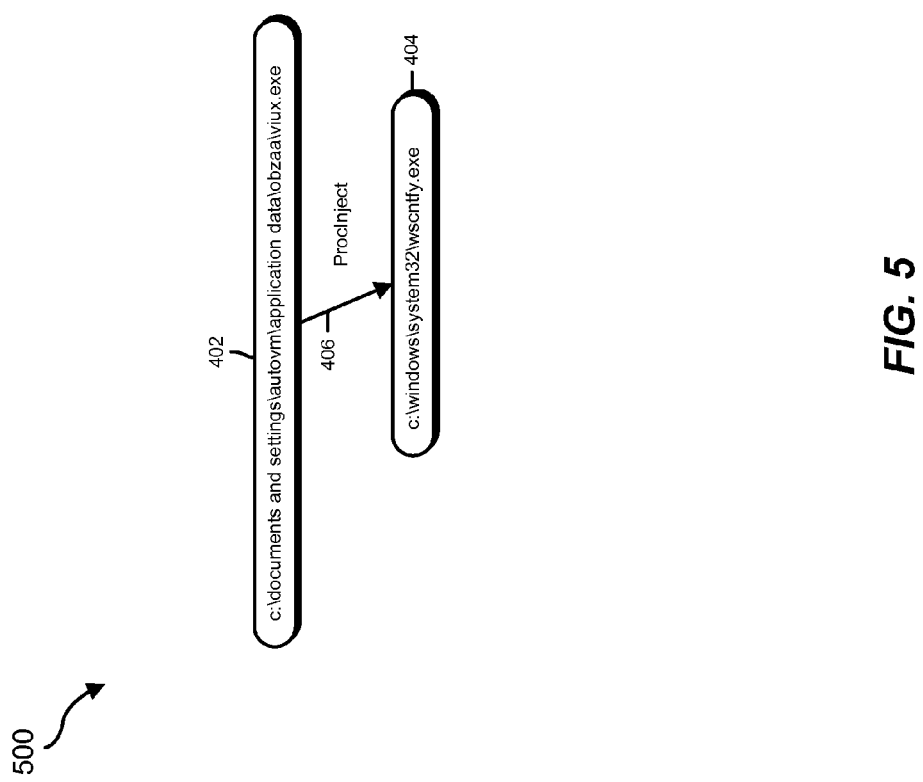
FIG. 5 is a block diagram of an exemplary iteration of an event-correlation graph in construction.

FIGS. 5-8 illustrate how constructing module 106 may iteratively construct event-correlation graph 400 in FIG. 4. FIG. 5 is a block diagram of an exemplary event-correlation graph iteration 500. As shown in FIG. 5, event-correlation-graph iteration 500 may represent a first iteration in the construction of event-correlation graph 400 in FIG. 4. In this example, detecting module 104 may have detected a suspicious process-injection event involving the processes "viux.exe" and "wscntfy.exe." In response to this detection, constructing module 106 may have generated event-correlation-graph iteration 500 that includes node 402 that represents the process "viux.exe" and node 404 that represents the process "wscntfy.exe" connected by an edge 406 that represents the suspicious process-injection event.

Figure 6:
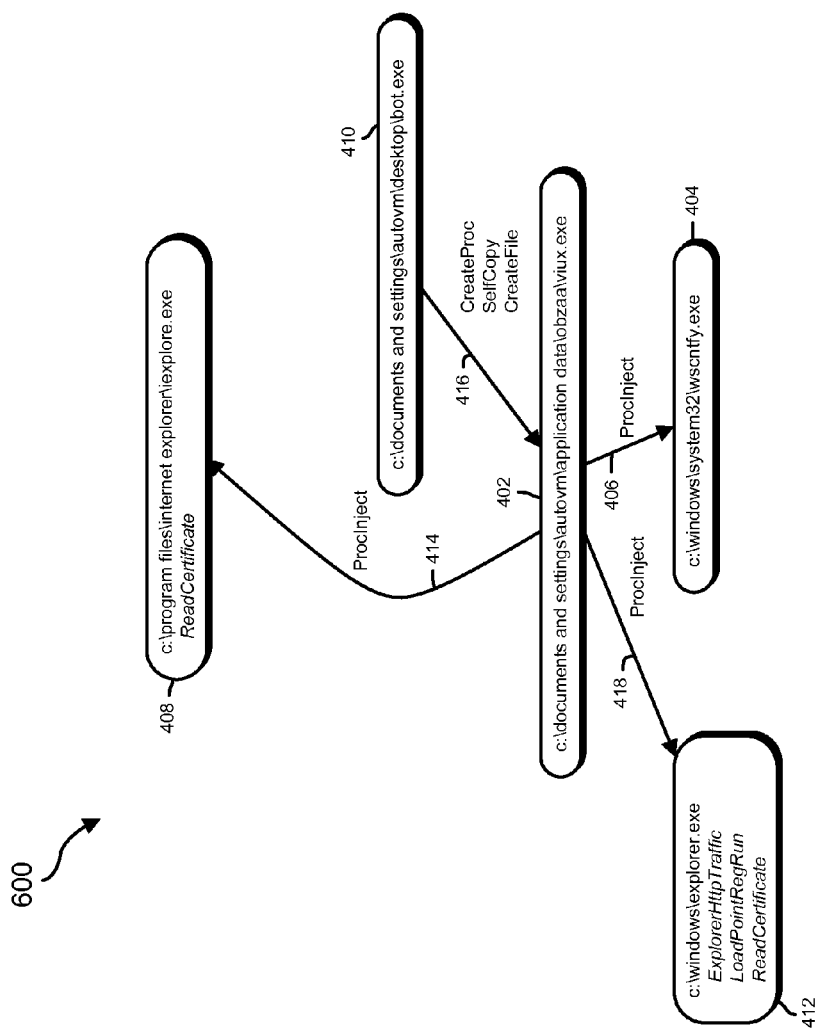
FIG. 6 is a block diagram of an exemplary iteration of an event-correlation graph in construction.

Using FIGS. 5 and 6 as an example, constructing module 106 may identify, for executable "viux.exe" represented by node 402 within event-correlation graph 400, a set of suspicious events that involve executable "viux.exe" and one of executables "iexplorer.exe," "bot.exe," and "explorer.exe." Constructing module 106 may add nodes to event-correlation graph 400 that represent these additional actors (e.g., nodes 408, 410, and 412) and edges that represent the set of suspicious events (e.g., edges 414, 416, and 418) and that interconnect node 402 and nodes 408, 410, and 412. In the example shown in FIG. 5, constructing module 106 may have not found any additional suspicious events that involved executable "wscntfy.exe."

Using FIG. 6 as an example, constructing module 106 may identify, for executable "explorer.exe" represented by node 412 within event-correlation graph 600, a set of suspicious events that involve executable "viux.exe" and no other actors. For example, constructing module 106 may identify three suspicious events that involved only "explorer.exe" (e.g., "ExplorerHttpTraffic," "LoadPointRegRun," and "ReadCertificate") Constructing module 106 may attribute these suspicious events to node 506 as shown in FIG. 6.

Figure 7:
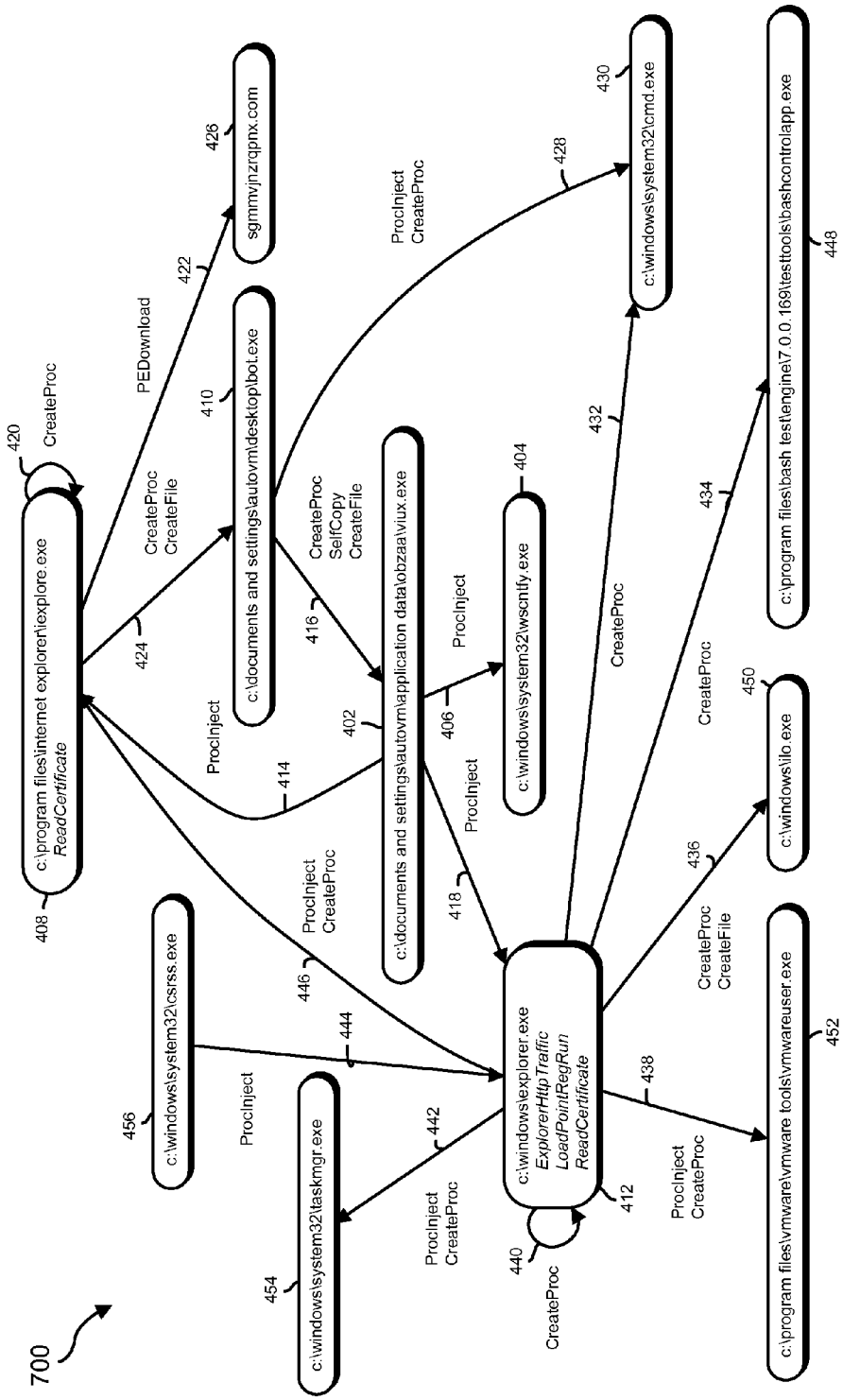
FIG. 7 is a block diagram of an exemplary iteration of an event-correlation graph in construction.
Figure 8:
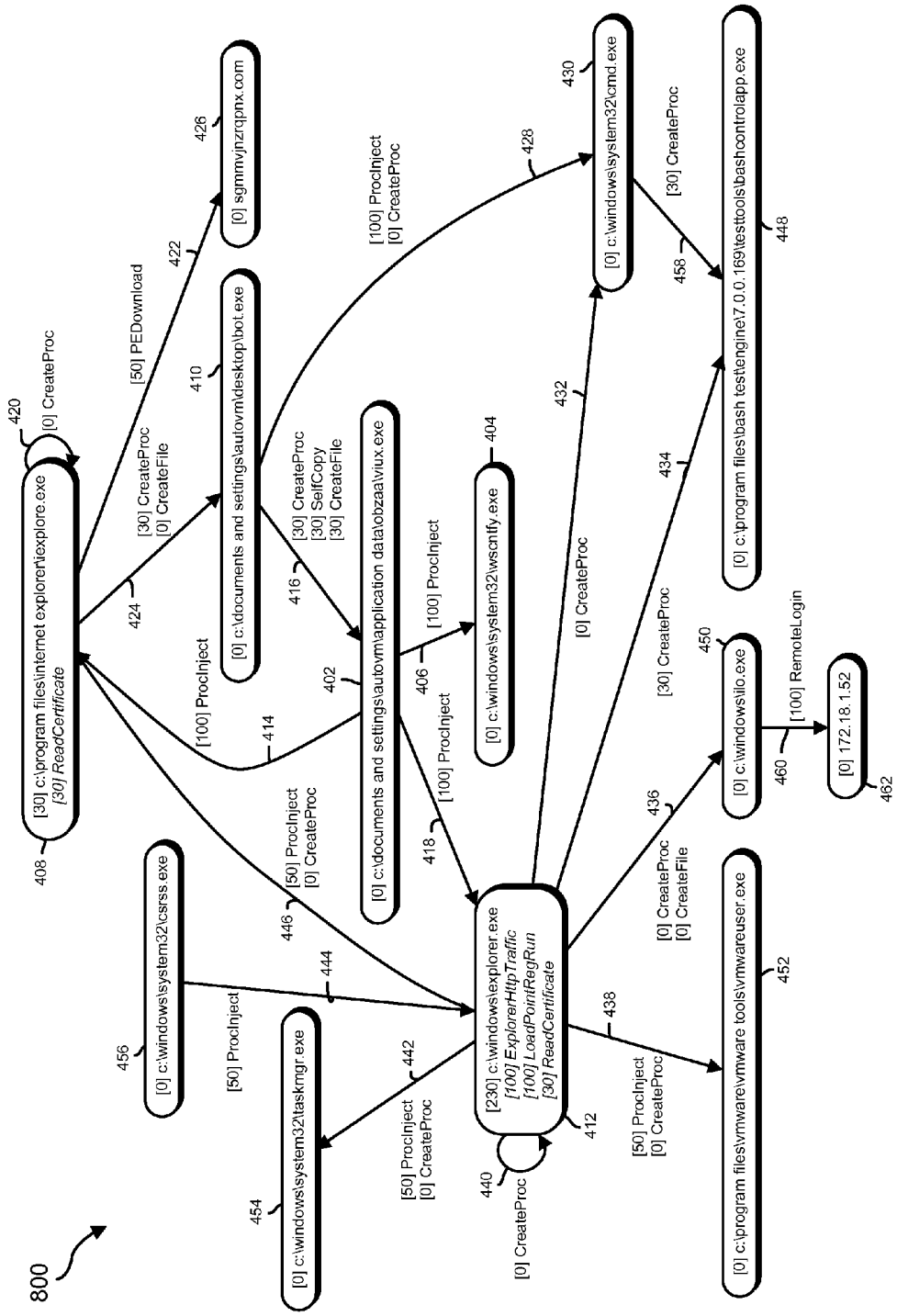
FIG. 8 is a block diagram of an exemplary event-correlation graph with threat scoring.

Using FIG. 7 as an example, constructing module 106 may perform another iteration of expanding the graph beyond nodes 408, 410, and 412 by adding edges and nodes 420-456 that represent events and actors that relate to newly-added nodes 408, 410, and 412. Referring back to FIG. 4, constructing module 106 may then add another iteration of events and nodes (e.g., events 458 and 460 and a node 462) to event-correlation graph 400.

In some examples, constructing module 106 may calculate an attack score for the event-correlation graph that is based at least in part on the additional suspicious event involving the first actor and the second actor. In these examples, constructing module 106 may further determine that the attack score is greater than an attack-score threshold. In this manner, the systems described herein may determine that the suspicious event potentially represents a part of an attack and may, in response compare the event-correlation graph with one or more additional event-correlation graphs to determine whether the attack score represents a false positive.

Constructing module 106 may calculate the attack score for the event-correlation graph in any suitable manner. In one example, construction module 106 may calculate the attack score for the event-correlation by (1) identifying all or a portion of the suspicious events represented within the event-correlation graph, (2) identifying a suspiciousness score associated with each of the identified suspicious events, and (3) using the suspiciousness scores to calculate an attack score for the graph.

In some examples, each suspicious event represented within an event-correlation graph may be associated with a suspiciousness score, and construction module 106 may calculate an attack score for the event-correlation graph based on the suspiciousness score of each suspicious event represented within the event-correlation graph. Using FIG. 8 as an example, the suspicious event represented by edge 406 may be associated with a suspiciousness score of 100, the suspicious event represented by edge 420 may be associated with a suspiciousness score of 0, and the suspicious event attributed to the actor represented by node 408 may be associated with a suspiciousness score of 30.

In some examples, construction module 106 may calculate an attack score for an event-correlation graph based on scores for each node and/or edge within the event-correlation graph. For example, construction module 106 may calculate an attack score for an event-correlation graph by calculating a score for each edge within the event-correlation graph based on the suspiciousness scores associated with the suspicious events represented by the edge, calculating a score for each node within the event-correlation graph based at least in part on a suspiciousness score associated with each suspicious event associated with the node, and calculating the attack score for the event-correlation graph based at least in part on the score for each edge within the event-correlation graph and/or the score for each node within the event-correlation graph. In one example, construction module 106 may calculate an attack score for an event-correlation graph by simply adding together the suspiciousness scores of each suspicious event represented within the event-correlation graph. Using FIG. 8 as an example, construction module 108 may calculate an attack score equal to 1,190 for event-correlation graph 800 by adding together the suspiciousness scores of each suspicious event represented within the event-correlation graph 800.

In some examples, constructing module 106 may remove low-scoring nodes from an event-correlation graph before calculating an attack score for the event-correlation graph based on a score of the low-scoring node being less than an additional predetermined threshold. In this manner, constructing module 106 may reduce the chance of irrelevant events and/or actors adding to the attack score and may also preserve only the relevant portions of the event-correlation graph for comparison with other event-correlation graphs.

Additionally or alternatively, constructing module 106 may remove remote nodes from the event-correlation graph before calculating the attack score for the event-correlation graph based on a distance of the remote node from the first node being greater than an additional predetermined threshold. In this manner, constructing module 106 may reduce the chance of irrelevant events and/or actors adding to the attack score and may also preserve only the relevant portions of the event-correlation graph for comparison with other event-correlation graphs.

Returning to FIG. 3, at step 306 one or more of the systems described herein may compare the event-correlation graph with at least one additional event-correlation graph that represents events on at least one additional computing system. For example, comparing module 108 may, as part of server 206 in FIG. 2, compare event-correlation graph 230 with event-correlation graph 240 that represents events on an additional computing system (e.g., computing device 202(N)).

Comparing module 108 may identify the additional event-correlation graph in any suitable context. For example, correlation module 108 may identify the additional event-correlation graph by receiving the additional event-correlation graph from the additional computing system (e.g., that generated the additional event-correlation graph and/or events on which the additional event-correlation graph describes). Additionally or alternatively, comparing module 108 may identify the additional event-correlation graph within a database of event-correlation graphs (e.g., that have recently been collected from a set of computing systems).

Comparing module 108 may compare the event-correlation graph with the additional event-correlation graph in any suitable manner. In some examples, comparing module 108 may compare the event-correlation graph with the additional event-correlation graph by comparing the nodes and edges of the respective graphs and determining whether the event-correlation graph and additional event-correlation graph match exactly and/or are isomorphic. Additionally or alternatively, comparing module 108 may search the additional event-correlation graph for a subgraph of the event-correlation graph and/or search the event-correlation graph for a subgraph of the additional event-correlation graph. In one example, comparing module 108 may compare one or more subgraphs of the event-correlation graph with the additional event-correlation graph. For example, comparing module 108 may select one or more subgraphs of the event-correlation graph that, alone, indicate a potential attack. In some examples, comparing module 108 may compute a similarity value between the event-correlation graph and the additional event-correlation graph based on how many additions, subtractions, and or modifications of nodes, edges, and/or branches of the event-correlation graph and/or the additional event-correlation graph are required to reach a match between the event-correlation graph and the additional event-correlation graph.

In some examples, comparing module 108 may treat distinct but similar actors as matching nodes for purposes of determining isomorphism between the event-correlation graph and the additional event-correlation graph. In these examples, comparing module 108 may compute a similarity value between the event-correlation graph and the additional event-correlation graph based on a similarity between the respective actors of the matching nodes.

Returning to FIG. 3, at step 308 one or more of the systems described herein may determine that a similarity of the event-correlation graph and the additional event-correlation graph exceeds a predetermined threshold. For example, at step 308 determining module 110 may, as part of computing devices 202(1)-(N) in FIG. 2, determine that a similarity of event-correlation graph 230 and additional event-correlation graph 240 exceeds predetermined threshold 250.

Determining module 110 may determine that the similarity of the event-correlation graph and the additional event-correlation graph exceeds the predetermined threshold in any suitable manner. In some examples, as mentioned earlier, the systems described herein may compare the event-correlation graph and additional event-correlation graph for an exact match and/or full isomorphism. In these examples, determining module 110 may determine that the similarity exceeds the predetermined threshold by determining that the event-correlation graph and the additional event-correlation graph fully match. In some examples, as mentioned earlier, the systems described herein may compute a similarity value between the respective graphs based on an edit distance between the respective graphs and/or based on similarities between actors represented by corresponding nodes of the respective graphs. In these examples, determining module 110 may determine that the similarity exceeds the predetermined threshold by comparing the computed similarity value to the predefined threshold.

Returning to FIG. 3, at step 310 one or more of the systems described herein may classify the suspicious event as benign based at least in part on determining that the similarity of the event-correlation graph and the additional event-correlation graph exceeds the predetermined threshold. For example, at step 310 classifying module 112 may, as part of computing devices 202(1)-(N) in FIG. 2, classify suspicious event 222 as benign based at least in part on determining that the similarity of event-correlation graph 230 and additional event-correlation graph 240 exceeds predetermined threshold 250.

Classifying module 112 may classify the suspicious event as benign using any of a variety of criteria. In some examples, the systems described herein may gather and compare many event-correlation graphs to the event-correlation graph and determine that a number of the event-correlation graphs are similar to the event-correlation graph. In these examples, classifying module 112 may classify the suspicious event as benign by determining that the number of computing systems with event-correlation graphs that are similar to the event-correlation graph exceeds a predetermined size. For example, classifying module 112 may determine that the suspicious event is benign based on determining that at least two hundred computing systems have generated event-correlation graph similar to the event correlation graph. In some examples, the predetermined size may vary according to an attribute of the suspicious event, an attribute of the event-correlation graph and/or a current sample size of computing systems.

In some examples, the systems described herein may wait for a predetermined period of time and collect event-correlation graphs from computing systems before classifying the suspicious events. For example, classifying module 112 may ensure that the predetermined period of time (e.g., an hour, a day, a week, etc.) has passed to give time for other computing systems to generate and/or submit event-correlation graphs (and/or event and actor information for constructing event-correlation graphs) before classifying the suspicious event. In some examples, determining module 110 and/or classifying module 112 may determine that sufficient event-correlation graphs have been collected and compared with the event-correlation graph to determine that the suspicious event is benign. In these examples, classifying module 112 may classify the suspicious event as benign without further waiting.

In some examples, the systems described herein may determine that an insufficient number of event-correlation graphs match the event-correlation graph (e.g., the number of similar event-correlation graphs falls below the predetermined size). In these examples, classifying module 112 may determine that the suspicious event represents an attack. According, in these examples, classifying module 112 may perform a security action to remediate the attack (e.g., by blocking one or more events on the computing system, by blocking, quarantining, and/or removing one or more actors from the computing system, and/or by reporting one or more events and/or actors to a security system).

As explained above in connection with method 300 in FIG. 3, the systems and methods described herein may detect attacks on computing systems with low false positive rates by comparing event-correlation graphs across machines and designating suspicious events that result in common event-correlation graphs benign. In one example, once an event-correlation graph (or an "attack graph") is generated, the systems described herein may wait for a defined period of time. These systems may then compare the attack graph with attack graphs from other machines. If many machines generate similar attack graphs, the systems described herein may conclude that the suspicious event behind the attack graph is likely a false positive. Because targeted attacks may be stealthy and affect only a small number of machines, the systems described herein may differentiate targeted attacks from massively deployed applications that demonstrate potentially malicious but ultimately benign behaviors.

Figure 9:
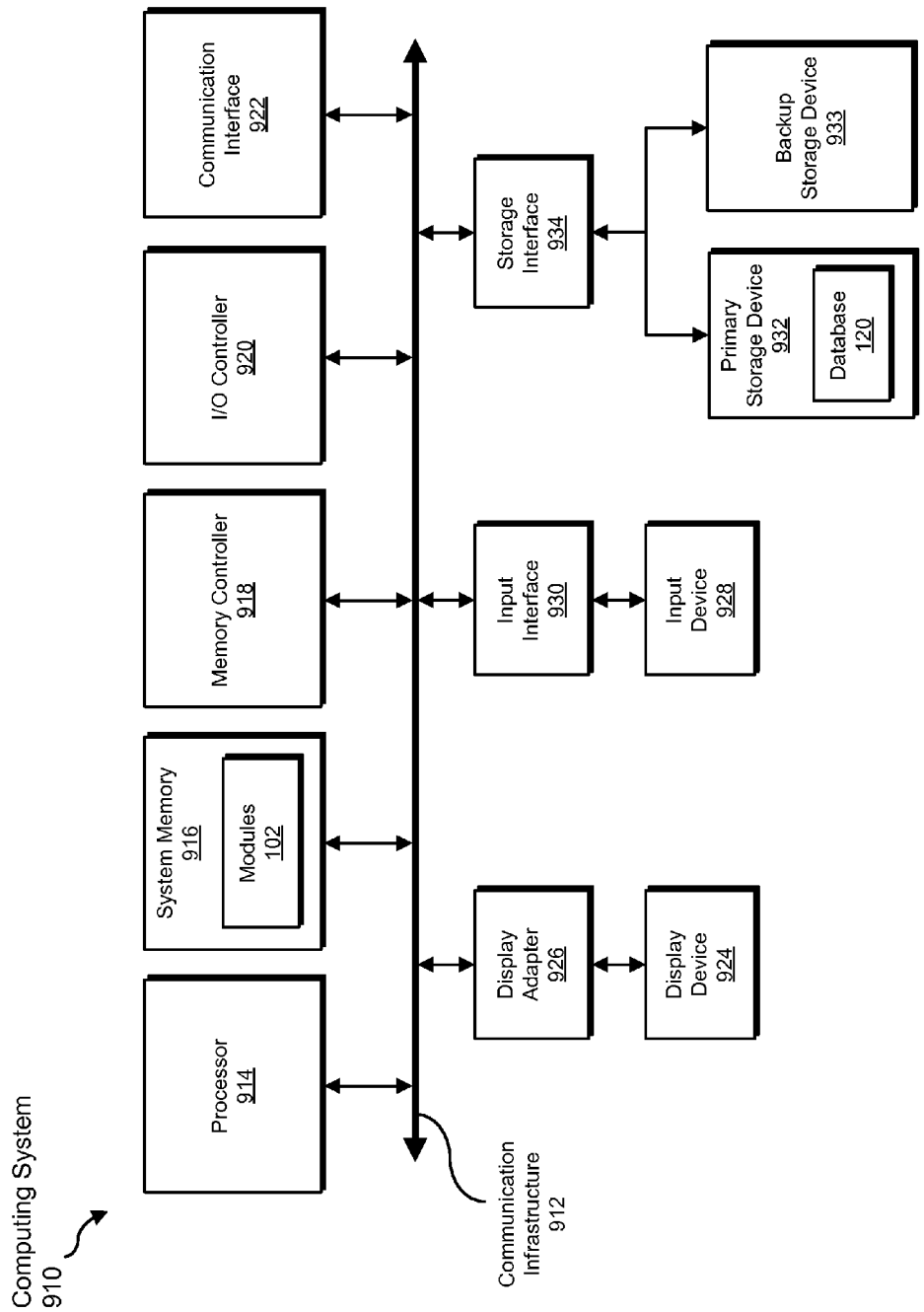
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 3). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the exemplary embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910. In one example, database 120 from FIG. 1 may be stored in primary storage device 932.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 910. All or a portion of the computer program stored on the computer-readable-storage medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an Application Specific Integrated Circuit (ASIC) adapted to implement one or more of the exemplary embodiments disclosed herein.

Figure 10:
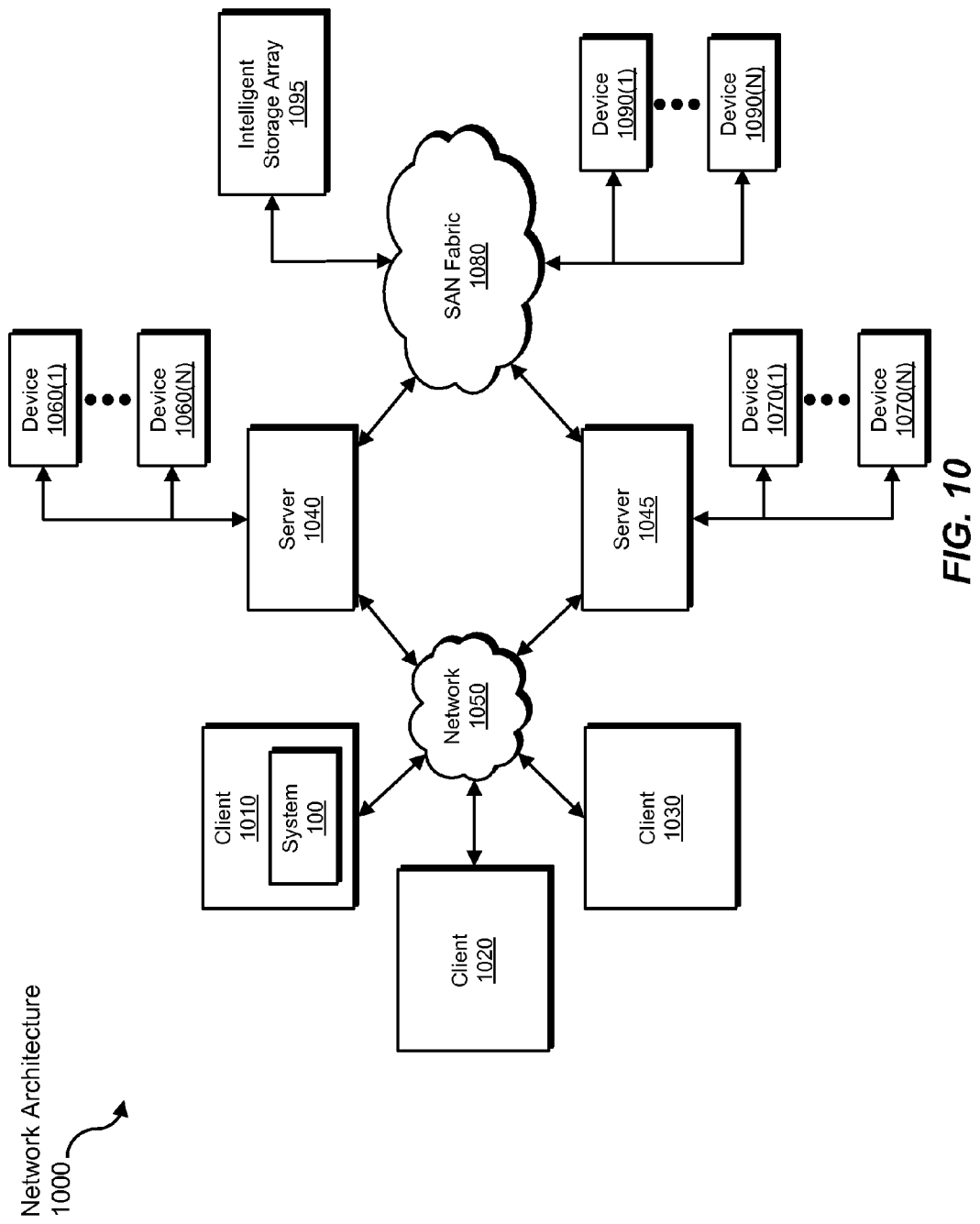
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the steps disclosed herein (such as one or more of the steps illustrated in FIG. 3). All or a portion of network architecture 1000 may also be used to perform and/or be a means for performing other steps and features set forth in the instant disclosure.

Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an exemplary method for reducing false positives when using event-correlation graphs to detect attacks on computing systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive event-correlation graphs to be transformed, transform the event-correlation graphs into determinations about possible attacks, output the determinations about possible attacks to an administrator, use the result of the transformation to interrupt or allow an application to execute, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for reducing false positives when using event-correlation graphs to detect attacks on computing systems, at least a portion of the method being performed by a computing device comprising at least one processor, the method comprising:
   detecting a suspicious event involving a first actor within a computing system;
   constructing, in response to detecting the suspicious event involving the first actor, an event-correlation graph, wherein the event-correlation graph comprises at least:
      a first node that represents the first actor;
      a second node that represents a second actor;
      an edge that interconnects the first node and the second node and represents an additional suspicious event involving the first actor and the second actor;
   comparing, at a server device that collects event information from a plurality of computing systems including the computing system, the event-correlation graph with at least one additional event-correlation graph that represents events generated on at least one additional computing system within the plurality of computing systems;
   determining that a similarity of the event-correlation graph and the additional event-correlation graph exceeds a predetermined threshold;
   classifying the suspicious event as benign based at least in part on determining that the similarity of the event-correlation graph and the additional event-correlation graph exceeds the predetermined threshold.

2. The computer-implemented method of claim 1, wherein classifying the suspicious event as benign comprises determining a number of computing systems within the plurality of computing systems with event-correlation graphs that are similar to the event-correlation graph exceeds a predetermined size.

3. The computer-implemented method of claim 1, further comprising waiting for a predetermined period of time and collecting event-correlation graphs from the plurality of computing systems before classifying the suspicious event.

4. The computer-implemented method of claim 1, wherein constructing the event-correlation graph comprises:
   calculating, based at least in part on the additional suspicious event involving the first actor and the second actor, an attack score for the event-correlation graph;
   determining that the attack score is greater than an attack-score threshold.

5. The computer-implemented method of claim 1, wherein the suspicious event comprises a process injection.

6. The computer-implemented method of claim 5, wherein the additional suspicious event comprises at least one of:
   a process injection;
   a creation of a file;
   a download of an executable file;
   a creation of a process.

7. The computer-implemented method of claim 1, wherein constructing the event-correlation graph comprises, for each actor represented by a node within the event-correlation graph:
   identifying a set of events that involve the actor and at least one additional actor;
   for each event within the set of events:
      adding an additional node to the event-correlation graph that represents the additional actor;
      adding an additional edge to the event-correlation graph that interconnects the node and additional node and represents the event involving the actor and the additional actor.

8. The computer-implemented method of claim 1, wherein constructing the event-correlation graph comprises, for each actor represented by a node within the event-correlation graph:
   identifying a set of suspicious events that involve the actor and no other actor;
   associating each suspicious event within the set of suspicious events with the node that represents the actor.

9. The computer-implemented method of claim 1, wherein:
   each suspicious event represented within the event-correlation graph is associated with a suspiciousness score;
   constructing the event-correlation graph comprises calculating an attack score for the event-correlation graph based at least in part on the suspiciousness score of each suspicious event represented within the event-correlation graph.

10. The computer-implemented method of claim 1, wherein constructing the event-correlation graph comprises calculating an attack score for the event-correlation graph by:
    calculating a score for the edge based at least in part on a suspiciousness score associated with the additional suspicious event;
    calculating the attack score for the event-correlation graph based at least in part on the score for the edge.

11. The computer-implemented method of claim 1, wherein constructing the event-correlation graph comprises calculating an attack score for the event-correlation graph by:
    calculating a score for each node within the event-correlation graph based at least in part on a suspiciousness score associated with each suspicious event associated with the node;
    calculating the attack score for the event-correlation graph based at least in part on the score for each node within the event-correlation graph.

12. The computer-implemented method of claim 1, wherein:
    constructing the event-correlation graph comprises calculating an attack score for the event-correlation graph;
    the method further comprises removing, before calculating the attack score for the event-correlation graph, at least one low-scoring node from the event-correlation graph based at least in part on a score of the low-scoring node being less than an additional predetermined threshold.

13. The computer-implemented method of claim 1, wherein:
    constructing the event-correlation graph comprises calculating an attack score for the event-correlation graph;
    the method further comprises removing, before calculating the attack score for the event-correlation graph, at least one remote node from the event-correlation graph based at least in part on a distance of the remote node from the first node being greater than an additional predetermined threshold.

14. A system for reducing false positives when using event-correlation graphs to detect attacks on computing systems, the system comprising at least one processor coupled to memory that:
    detects a suspicious event involving a first actor within a computing system;
    constructs, in response to detecting the suspicious event involving the first actor, an event-correlation graph, wherein the event-correlation graph comprises at least:
       a first node that represents the first actor;

a second node that represents a second actor;

an edge that interconnects the first node and the second node and represents an additional suspicious event involving the first actor and the second actor;

compares, at a server device that collects event information from a plurality of computing systems including the computing system, the event-correlation graph with at least one additional event-correlation graph that represents events generated on at least one additional computing system within the plurality of computing systems;

determines that a similarity of the event-correlation graph and the additional event-correlation graph exceeds a predetermined threshold;

classifies the suspicious event as benign based at least in part on determining that the similarity of the event-correlation graph and the additional event-correlation graph exceeds the predetermined threshold.

15. The system of claim 14, wherein the processor classifies the suspicious event as benign by determining a number of computing systems within the plurality of computing systems with event-correlation graphs that are similar to the event-correlation graph exceeds a predetermined size.

16. The system of claim 14, wherein the processor further waits for a predetermined period of time and collects event-correlation graphs from the plurality of computing systems before classifying the suspicious event.

17. The system of claim 14, wherein the processor constructs the event-correlation graph by:

calculating, based at least in part on the additional suspicious event involving the first actor and the second actor, an attack score for the event-correlation graph;

determining that the attack score is greater than an attack-score threshold.

18. The system of claim 14, wherein the suspicious event comprises a process injection.

19. The system of claim 18, wherein the additional suspicious event comprises at least one of:

a process injection;

a creation of a file;

a download of an executable file;

a creation of a process.

20. A non-transitory computer-readable-storage medium comprising one or more computer-readable instructions that, when executed by at least one processor of a computing device, cause the computing device to:

detect a suspicious event involving a first actor within a computing system;

construct, in response to detecting the suspicious event involving the first actor, an event-correlation graph, wherein the event-correlation graph comprises at least:

a first node that represents the first actor;

a second node that represents a second actor;

an edge that interconnects the first node and the second node and represents an additional suspicious event involving the first actor and the second actor;

compare, at a server device that collects event information from a plurality of computing systems including the computing system, the event-correlation graph with at least one additional event-correlation graph that represents events generated on at least one additional computing system within the plurality of computing systems;

determine that a similarity of the event-correlation graph and the additional event-correlation graph exceeds a predetermined threshold;

classify the suspicious event as benign based at least in part on determining that the similarity of the event-correlation graph and the additional event-correlation graph exceeds the predetermined threshold.

\* \* \* \* \*